Patented May 22, 1951

2,553,677

UNITED STATES PATENT OFFICE 2,553,677

SYNTHETIC RESIN FROM FURFURYL ALCOHOL WITH BORON TRIFLUORIDE CATALYST

Charles S. Rowland, Larchmont, N. Y., assignor to Interchemical Corporation, New York, N. Y., a corporation of Ohio No Drawing. Application March 25, 1948, Serial No. 17,109

3 Claims. (Cl. 260—88.5)

This invention relates to the process of condensing furfuryl alcohol to obtain viscous water insoluble thermosetting resins.

It is known that furfuryl alcohol can be condensed, with or without catalysts such as sulfuric acid and hydrochloric acid, to obtain viscous thermosetting resins. However, the prior art processes for condensing furfuryl alcohol do not give thermosetting resinous products that have satisfactory cured film properties, the major disadvantages being that cured films prepared from these resins by baking the films at resin curing temperatures are spotty and heterogeneous in appearance. It has now been discovered that thermosetting resinous products having good film properties can be produced by properly controlling the conditions under which the furfuryl alcohol is condensed. The resinous products prepared according to my novel process give continuous, homogeneous cured films, having good resistance to acids, alkali, saline solution, and many organic solvents. The films possess many other desirable properties which make them useful in many different applications.

Essentially the process of the present invention, whereby improved resinous condensation products of furfuryl alcohol are obtained comprises reacting the furfuryl alcohol in a water immiscible solvent comprising ketones, esters, ethers, or mixtures thereof, in the presence of boron trifluoride catalyst, by heating the solution to reflux temperature and removing a predetermined amount of water formed in the condensation reaction by azeotropic distillation with the water-immiscible ketone, ester, or ether.

The catalyst, either boron trifluoride gas or preferably boro trifluoride complexes such as the diethyl ether complex, dihexyl ether complex, or acetic acid complex, is preferably used in the amount of 0.05 to 0.2% calculated as 100% boron trifluoride and based on the amount of furfuryl alcohol in the solution. Although it is preferred to use only 0.05 to 0.2% of the catalyst, it has been found that amounts as low as 0.01% and amounts as high as 1.0% can be used without particularly noticeable disadvantages. It also appears that of numerous catalysts that have been tested the boron trifluoride catalysts are unique in obtaining the desirable results of the present invention. For instance, the use of hydrochloric acid catalyst was found to be unsatisfactory because the condensation was incomplete; p-toluene sulfonic acid produced an erratic reaction with premature gelation; and $AlCl_3$ gave an incompletely reacted product with the formation of insoluble material even at the beginning of reaction.

It has been found that water-immiscible ketones, esters, and ethers and mixtures thereof, are the most satisfactory solvents in which to carry out the condensation. Examples of such solvents include isopropyl acetate, butyl acetate, isobutyl acetate, methyl isobutyl ketone, isophorone, cyclohexanone, dipropyl ether, dibutyl ether and Cellosolve (mono ethyl ether of ethylene glycol) acetate. In general temperatures of the order of 75° to 175° C. can be used, however, it is preferred that the condensation be carried out at a temperature of from about 100° to about 150° C. Necessarily therefore, it will be preferable when employing a relatively low boiling solvent such as isopropyl acetate (B. P. 89° C.) to employ enough of a higher boiling co-solvent, for instance, Cellosolve acetate, B. P. 156° C., to bring the boiling point of the solution up within the preferred range. A convenient method of obtaining a solution having a boiling point within the desired range when a low boiling solvent is being used is to first dissolve the furfuryl alcohol in the low boiling solvent, heat the solution to boiling, and while maintaining the solution at a boiling temperature adding a sufficient amount of a higher boiling co-solvent to bring the boiling point up to the preferred range. Solvents other than ketones, ethers and esters have been tested but in general all of these other solvents have proved unsatisfactory when used in the absence of the ketone and ester solvents. Among the solvents that have been found to be unsatisfactory when used alone are benzene, toluene, mineral spirits, and butanol. Although it is preferred that the solvent consist entirely of volatile esters, ethers and ketones, it is in general possible to use up to about 50% of another solvent such as benzene, toluene, mineral spirits or butanol.

The concentration of furfuryl alcohol in the original solution is not particularly critical. Concentrations of between 15 and 75% by weight have been found to be operable, however, for convenience in controlling the reaction and working up the product, concentrations of from 25 to 40% are preferred. Furfuryl alcohol of substantially pure grade is preferred, for instance, commercial grades of furfuryl alcohol, which are usually dark in color and contain several per cent of water, are first distilled, preferably under reduced pressure, and the clear water white and water free product distilling over a 2-3 degree range is collected and used in the present invention.

It is recognized that it has long been the practice to remove water of reaction during the course of a chemical reaction by azeotropically distilling it with a water-immiscible volatile solvent. In such prior art practice, the choice of the particular solvent that is used is governed to some extent by reaction temperature that is to be employed, and by the fact that a solvent which is non-reactive under the reaction conditions must be used. In general however, the class of water-immiscible volatile solvents that have been used in prior art practices include, aliphatic hydrocarbons, ketones, alcohols, esters, ethers, and the like.

The discovery on which the present invention is based is that not only must a predetermined definite amount of water of reaction be removed but also that the improved results of the present invention can only be obtained by removal of this definite amount of water by azeotropic distillation with certain members of the general class of compounds consisting of water-immiscible volatile solvents, viz., the water-immiscible volatile ketones, esters and ethers. There appears to be no obvious or apparent reason why results are obtained using the water-immiscible ketones and esters and not with other water-immiscible solvents. However, other solvents, including aliphatic hydrocarbons, aromatic hydrocarbons, and alcohols, have been tested in the process without success, unless they were used along with at least about 50% of a water-immiscible volatile ketone, ester, or ether.

The solvents that are operable in the present invention are all oxygenated solvents and hence could be considered generally as water-immiscible volatile oxygenated organic solvents. An explanation of the fact that only certain oxygenated solvents are operable in the invention is not known, however. It is obvious why an oxygenated solvent which is reactive with the furfuryl alcohol would not be operable, e. g. aldehydes, but it is not obvious why other oxygenated solvents, e. g. butyl alcohols, are not operable when used alone. The only apparent difference between the alcohols and the operable solvents is that butyl alcohol contains a hydrogen atom attached directly to oxygen whereas the operable solvents contain no hydrogen atoms attached to oxygen in the functional grouping that is necessary for operability, i. e. the ketone, ester, and other groups.

By carrying out the condensation of the furfuryl alcohol, according to the process of the invention, it is possible to remove up to about 0.88 mole of water per mole of furfuryl alcohol in the reaction mixture. In order to obtain a resin that will give a clear, homogeneous cured film it has been found that it is necessary to remove at least 0.75 mole of water per mole of furfuryl alcohol. It is therefore essential that the condensation be continued until at least 0.75 mole of water per mole of furfuryl alcohol has been removed. Tests indicate, however, that resins having the best overall properties are obtained by removing from about 0.76 to 0.80 mole of water per mole of furfuryl alcohol; this range is therefore the preferred range.

After completion of the condensation reaction the catalyst should be removed from the product in order to obtain a product having good storage stability. This may be effected by any of the commonly used methods as for instance by adsorption of boron trifluoride by a siliceous earth such as celite or fuller's earth, or by adsorption on aluminum hydrate, and subsequent filtration. Another useful method of removing the boron trifluoride catalyst is to add aqueous alkali, e. g. sodium carbonate solution, in excess of the amount required to neutralize the catalyst, separate the aqueous layer, then wash the resin solution with water, and then dry the resin solution over a neutral salt such as sodium sulfate or by heating in vacuo.

The resins prepared in accordance with the present invention are heat reactive or thermosetting. When dissolved in the usual types of varnish and lacquer solvents, such as volatile ketones, esters, alcohols, aliphatic and aromatic hydrocarbons and the like, and in the presence of additives, such as plasticizers, driers, pigments, fillers and the like, if such additives are desired, the furfuryl alcohol resin can be formed into films by the usual methods of brushing, spraying, roller coating, and the like. Evaporation of the solvents and curing of the films by baking at elevated temperatures, e. g. 200 to 450° F. produces films having good alkali and acid resistance, good resistance to formaldehyde, turpentine, carbon tetrachloride, toluene, gasoline, ketones, esters, water and saline solution, etc. Such films are particularly suitable as protective coatings for metal. The films have good adhesion to metal surfaces to give hard but moderately flexible coatings, having good electrical properties. Another use for the resins produced by the present invention is as coatings for cloth for use in electrical applications.

The following examples are given to further illustrate the invention:

*Example I*

In a five-liter flask fitted with stirrer, reflux condenser, water-trap, and thermometer are placed 981 g. of distilled furfuryl alcohol, 1895 g. of Cellosolve acetate, 631 g. of methyl isobutyl acetate, and 2.09 g. of boron trifluoride-ethyl ether complex containing 47% boron trifluoride. The mixture is heated to reflux, commencing at approximately 107° C., and maintained there by gradually increasing the temperature during the reaction period. After about three and one-half hours at a final reaction temperature of about 130° C. there are collected 138 cc. of water, removed by azeotropic distillation. This corresponds to 13.8 cc. of water per mole of furfuryl alcohol in the original charge. The catalyst is neutralized by the addition of 147 g. of water containing 2.8 g. sodium carbonate. After stirring for one-two hours 147 g. of siliceous earth ("Celite") is added, the solution filtered and then distilled in vacuo to remove water and part of the solvent to a solids content of 30–40%.

*Example II*

Using the procedure employed in Example I a similar preparation was carried out using 98.1 g. of distilled furfuryl alcohol, 93.1 g. of methyl isobutyl ketone, and 0.85 g. of a 5.8% solution of boron trifluoride as the ethyl ether complex, in methyl ethyl ketone. After about five hours 13.7 cc. of water was collected. When a sample of this resin was formed into a film and baked at 325° F. for 20 minutes a continuous, homogeneous film was obtained.

*Example III*

Using the same procedure employed in Example I a similar preparation was carried out using 98.1 g. of distilled furfuryl alcohol, 189 g.

of Cellosolve acetate, 63.1 g. of isobutyl acetate, and 1.32 g. of 7.6% solution of boron trifluoride as the dihexyl ether complex in isobutyl acetate. After about two hours 14.5 cc. of (0.805 mole) of water was collected.

*Example IV*

Using the procedure employed in Example I a similar preparation was carried out using 98.1 g. of distilled furfuryl alcohol, 77 g. of benzene and 1.7 g. of a 5.8% of boron trifluoride-diethyl ether complex in toluene. Soon after condensation begins insoluble particles settle out. After five hours only 12 cc. of water had been collected and after nine hours only 12.5 cc. of water had been collected. When a sample of the resin was formed into a film and baked in air at 325° F. for 20 minutes, a spotty, heterogeneous film was obtained. By comparing the results of this example with the results obtained in Example II, the beneficial effects of using the ketone and ester solvents of the present invention are readily apparent.

*Example V*

In another experiment, showing the effects of using water as the medium for carrying out the reaction and hydrochloric acid as catalyst, a 50% aqueous solution of furfuryl alcohol plus 1% of concentrated hydrochloric acid was heated gradually to a temperature of 85° C. over a period of one hour. The flask and contents were cooled rapidly and the resin layer was washed with 1% sodium carbonate solution until neutral. After drying in vacuo the viscosity of the dark brown furfuryl alcohol resin is 75–80 poises at 30° C. A thin film of the resin baked in air at 325° F. at 20 minutes is spotty and heterogeneous.

Having described my invention and the manner in which it may be practiced, I claim as my invention:

1. The method of preparing condensation products from furfuryl alcohol which comprises heating a 15 to 75% solution of furfuryl alcohol in a volatile water-immiscible non-reactive solvent of the class consisting of volatile water-immiscible ketones, carboxylic acid esters, and ethers, and mixtures thereof, in the presence of from 0.01 to 1% of boron trifluoride catalyst and separating the water of condensation by azeotropic distillation at a temperature of 75° to 175° C.

2. The method of preparing condensation products of furfuryl alcohol which comprises heating a 15 to 75% solution of furfuryl alcohol in a volatile water-immiscible non-reactive solvent of the class consisting of volatile water-immiscible ketones, carboxylic acid esters, and ethers, and mixtures thereof, in the presence of 0.01 to 1% of boron trifluoride catalyst and removing 0.75 to 0.88 mole of water of condensation per mole of furfuryl alcohol by azeotropic distillation at a temperature of 75° to 175° C.

3. A resin composition prepared by heat curing the thermosetting resin obtained by heating a 15 to 75% solution of furfuryl alcohol in a volatile water-immiscible non-reactive solvent of the class consisting of volatile ketones, carboxylic acid esters, and ethers, and mixtures thereof, in the presence of from 0.01 to 1% of boron trifluoride catalyst and removing 0.75 to 0.88 mole of water of condensation per mole of furfuryl alcohol by azeotropic distillation at a temperature of 75° to 175° C.

CHARLES S. ROWLAND.

REFERENCES CITED

The following references are of record in the file of this patent:

UNITED STATES PATENTS

| Number | Name | Date |
|---|---|---|
| 2,095,250 | Heberer | Oct. 12, 1937 |
| 2,267,830 | Lewis | Dec. 30, 1941 |
| 2,323,333 | Kauth | July 6, 1943 |
| 2,368,426 | Root | Jan. 30, 1945 |
| 2,399,055 | Nordlander | Apr. 23, 1946 |

FOREIGN PATENTS

| Number | Country | Date |
|---|---|---|
| 593,477 | Great Britain | Oct. 17, 1947 |
| 243,341 | Switzerland | Dec. 16, 1946 |